United States Patent [19]

Jalon

[11] Patent Number: 4,921,534

[45] Date of Patent: May 1, 1990

[54] SECURITY MARKINGS, MATERIAL PROVIDED WITH SECURITY MARKS, AND APPARATUS TO DETECT THE SECURITY MARK

[75] Inventor: Michel Jalon, Paris, France

[73] Assignee: Petrel, Paris, France

[21] Appl. No.: 427,784

[22] Filed: Oct. 27, 1989

Related U.S. Application Data

[62] Division of Ser. No. 325,935, Mar. 20, 1989, which is a division of Ser. No. 74,351, Jul. 16, 1987, Pat. No. 4,833,311.

[51] Int. Cl.$^5$ ............................................. C09D 11/00
[52] U.S. Cl. ....................................... 106/20; 283/72; 283/92; 427/157; 235/491
[58] Field of Search .......................... 106/20; 235/491; 283/72, 85, 89, 92; 250/363 R, 365; 427/157, 7

[56] References Cited

U.S. PATENT DOCUMENTS

| | | | |
|---|---|---|---|
| 4,056,495 | 11/1977 | Kawamura | 106/252 |
| 4,463,970 | 8/1984 | Kaule | 283/72 |
| 4,627,642 | 12/1986 | Peronneau | 283/92 |
| 4,736,425 | 4/1988 | Jalon | 283/92 |

*Primary Examiner*—Bruce A. Reynolds
*Assistant Examiner*—Leon K. Fuller
*Attorney, Agent, or Firm*—Finnegan, Henderson, Farabow, Garrett & Dunner

[57] ABSTRACT

The invention concerns a security-marking procedure, an apparatus to sense a security marking, fiduciary documents provided with security markings, by resorting to rare-earth chelates consisting of at least two rare-earths and of which the fluorescence wavelengths vary as functions of temperature, and fiduciary document containing such chelate(s).

6 Claims, No Drawings

SECURITY MARKINGS, MATERIAL PROVIDED WITH SECURITY MARKS, AND APPARATUS TO DETECT THE SECURITY MARK

This is a division of application Ser. No. 07/325,935, filed Mar. 20, 1989, which is a division of application Ser. No. 07/074,351, filed July 16, 1987, which issued as Patent No. 4,833,311 on May 23, 1989.

The prior art already has described the use of rare-earth fluorescent chelates to protect fiduciary documents requiring high security levels from counterfeiting (French patent 1,471,367, European patent application 66,854, French patent application 84 09807).

The invention disclosed herein proposes a security level which is higher than in the prior art by making it possible to vary the emission wavelengths of the rare-earth fluorescent chelates, and hence of materials including these chelates, in fiduciary documents, and to do this as a function of the temperature of the chelates and of the fiduciary documents in which they are incorporated.

This phenomenon was discovered by the applicant and occurs in those rare-earth chelates wherein an energy transfer takes place from a first rare earth to at least one second rare earth as a function of the temperature of the material holding the above chelate.

This phenomenon is denoted hereafter by the applicant as "thermally assisted energy-transfer chelates".

The expression "fiduciary documents" herebelow denotes such securities as bank notes, tickets, bonds, checks, stock shares, stamps, official documents, identification papers, passports, notebooks etc., credit cards, payment vouchers, boarding passes, and more generally all documents which must evince a high level of security and which must permit subsequent identification.

The illustrative and non-restrictive modes of implementation below elucidate the invention.

EXAMPLE 1

A thermally assisted energy-transfer chelate is prepared as follows: 4 moles of benzoylfluoroacetone are dissolved in ethanol and 4 moles of dimethylamine are added; this reaction mixture is shaken and heated and receives an aqueous solution of 0.9 moles of terbium chloride and 0.1 mole of europium chloride. This mixture precipitates in the form of flocculation which is filtered, washed and dried. Then 50 g of this terbium-/europium chelate are dissolved in a heliographic varnish (500 g) which is then used to print a plastic foil which next is cut into fine strips 1 mm wide that are introduced into the security paper in the form of security threads. At ambient temperature, the security paper so manufactured comprises a colorless security thread in natural or artificial light but which is highly fluorescent in the red spectrum (610–620 nm) when excited by ultraviolet (365 nm).

On the other hand, at the temperature of liquid nitrogen (77° K.), the security thread of this security paper, while remaining colorless in natural or artificial light, evinces a strong green fluorescence typical of terbium.

EXAMPLE 2

Another thermally assisted energy-transfer chelate is prepared by using terbium and samarium as the rare earths; the procedure of Example 1 is followed, however the benzoyltrifluoroacetone is replaced by thenoyltrifluoroacetone and the europium chloride by samarium chloride; polyamide fibers (22 dtex 3 mm) are dyed by the method described in the French patent application 84 09807, that is, by using a bath of methanol/water/terbium-samarium-chelate.

The fibers so dyed are dried and then added to the paper pulp and a security paper is thus fabricated.

This security paper contains security fibers which are colorless in visible light but which under ultraviolet excitation will be:
  fluorescent in the red spectrum (typical samarium emission) at ambient temperature, and
  fluorescent in the green spectrum (typical terbium emisssion) at 4° K. (liquid helium).

In this Example, using the same dyeing procedure, the polyamide fibers may be replaced by polyamide sewing yarn and the same result will be obtained, that is, illustratively for a security document of which the pages are sewn together by this polyamide yarn and which shall evince a change in fluorescent wavelength by changing from a red emission to a green emission when the document temperature is lowered from 300° K. to 4° K., for instance by immersing it into a bath of liquid helium.

EXAMPLE 3

A thermally assisted energy-transfer chelate is prepared by using gadolinium, terbium and europium as the rare earths, by repeating the procedure of Example 1 and by using 0.8 mole of gadolinium chloride, 0.19 mole of terbium chloride and 0.01 mole of europium chloride as the rare-earth chlorides.

10 g of this chelate are dissolved in a UV polymerizing black offset ink (250 g) which is spread on a credit card.

This credit card so printed is black in visible light; on the other hand, when UV excited, it is fluorescent in the red spectrum at ambient temperature and in the green spectrum at −30° C.

In this Example, the offset ink also may be replaced by a serigraphic ink or varnish.

EXAMPLE 4

By repeating the Example 3 (gadolinium-terbium-europium chelate dissolved an a UV polymerizing black offset ink and deposited on a credit card), a second identical black offset ink was deposited on the same credit card in adjacent manner, this second ink however lacking an energy-transfer chelate, that is, consisting solely of europium chloride.

When UV excited at ambient temperature, the two printings evince the same emission in the red spectrum. On the other hand, when the credit card is immersed in liquid nitrogen, this card evinces simultaneously a green fluorescent zone (from the energy transfer chelate) and a red fluorescent zone (from the chelate lacking energy transfer and made solely with europium chloride).

EXAMPLE 5

An energy-transfer chelate is prepared using lanthanum and terbium as the rare earths; by following the procedure of Example 1 and by using benzoylacetone as the ligand and 0.9 moles of lanthanum chloride and 0.1 mole of terbium chloride as the rare-earth(s), a chelate is obtained which when examined under the naked eye virtually lacks fluorescence under UV excitation.

This chelate is introduced into polyamide fibers by the dyeing procedure of Example 2 and security fibers are obtained thereby which are colorless in solar or artificial light, which do not fluoresce at ambient temperature when excited by UV (365 nm) but which are highly fluorescent in the green spectrum at 77° K.

Using the same chelate and incorporating it into a heliographic varnish deposited on a film itself cut into security threads incorporated into the paper, the same fluorescence results are obtained.

EXAMPLE 6

An energy-transfer chelate is prepared using neodymium & europium as the rare earths; the procedure of Example 1 is observed, using benzoyltrifluoroacetone as the ligand and 0.8 moles of neodymium chloride and 0.2 moles of europium chloride as the rare-earth(s).

This chelate is incorporated in the proportions stated in Example 1 into a first heliographic varnish.

Another chelate, lacking energy transfer, that is, consisting of the same ligand but containing only europium chloride (1 mole) is incorporated into a second heliographic varnish.

At the heliographic printer with two printing stations, the first varnish containing the neodymium-europium chelate is placed into the first trough and the second varnish containing the europium chelate is placed into the second trough.

A propylene film is printed, care being taken that the zones printed by the two heliographic cylinders constitute prints alternating at a particular rate.

This printed film is cut into strips constituting security threads incorporated into a security paper during its manufacture.

When excited by UV, this paper presents the following features:

at ambient temperature, it evinces a security thread which is uniformly fluorescent in the red spectrum (typical fluorescence of europium in both varnishes), at 77° K., it evinces a security thread alternating at the desired rate and having fluorescence zones in the red spectrum (typical of the europium of the second chelate) and fluorescence zones in the infrared (typical of the neodymium of the first chelate with energy transfer).

A fluorimeter sensitive in the visible and infrared spectra analyzes the fluorescent light and its variation in relation to the temperature of the security paper being UV excited at both ambient and low temperatures. This apparatus may be connected to another memorizing the particular desired rate of alternation and capable of comparing between read-out rate of the moving security paper to be authenticated and the stored rate and thereby to provide a go/no-go response in this automated authentication procedure of a security paper.

The temperature-dependent energy transfers in the rare-earth chelates were described above for the illustrations of the rare-earths Tb-Eu, Tb-Sm, Gd-Tb-Eu, Gd-Tb, Nd-Eu, and the expert may find others among the lanthanides, to which yttrium and thorium typically are associated, and the cited Examples do not constitute restriction on the invention.

In its most simple version the apparatus detecting the fluorescence of the thermally assisted energy-transfer chelates will be a UV exciting source having a support for the fiduciary documents and a trough holding a low-temperature liquid. The fiduciary document to be authenticated is presented manually or automatically to this apparatus, exposed to a source of ultra-violet, and it will therefore emit the intrinsic fluorescence of a rare earth, whereupon, still being UV excited, it is immersed in the cooled trough which may be transparent, and therefore will emit the intrinsic fluorescence of a second rare earth. Once so authenticated, the document is removed from the fountain and another document is then subjected to the same authentication test.

In this simplified embodiment, the authentication check is visual.

In a fuller embodiment of this apparatus, it may be equipped with a spectrofluorimeter to accurately check, in qualitative and quantitative manner, the emitted fluorescent wavelengths as a function of the temperature of the document being authenticated. Again it may include an electro-optical assembly with suitable optical filters to detect the change in the fluorescent wavelengths as a function of temperature and to display directly the result of the double check.

Depending on the kind of coolant used, for instance liquid helium, liquid nitrogen, dry ice or other, the fountain receiving the documents being authenticated may be open and constantly resupplied, or closed.

The cooled trough furthermore may be replaced by a jet of coolant by atomizing illustratively liquid nitrogen onto the fiduciary document.

Energy transfers between rare earths are well known in inorganic chemistry, however such transfers were not yet discovered in organic chemistry.

Again it was not known heretofore that such energy transfers in chelates are temperature-dependent.

Even though applicant cannot fully explain the phenomenon of the energy-transfer rare-earth chelates, he notes that for instance in the case of the terbium-europium chelate of Example 1, the organic part of the chelate (the ligand) triggers the fluorescence, not of terbium, but of europium present only by 10% of the rare earths, by means of a cascade of energy levels from terbium to europium.

On the other hand, when the temperature is lowered from 0° C. to 4° K., this energy transfer is progressively blocked and the excitation of the organic portion solely and directly is imparted to the terbium, the more so the lower the temperature.

The applicant prepared four fluorescence spectra:
(1) A spectrum of a chelate of the kind used in Example 1 but having europium as the sole rare earth. Regardless of temperature, the fluorescence is red (inherent to europium). Therefore there is no energy transfer in this chelate.
(2) A spectrium of the chelate of the type used in Example 1 but having solely terbium as rare earth. Regardless of temperature, the fluorescence is green (intrinsic to terbium). Accordingly there is no energy transfer in this chelate.
(3) A spectrum of the chelate of Example 1 (90% terbium/10% europium), at ambient temperature (20° C.). The fluorescence is red (inherent to europium), while that of terbium has vanished entirely.
(4) A spectrum of the above chelate while the temperature is progressively lowered from 20° C. to 4° K. Applicant observed a very significant drop in europium fluorescence starting at 0° C. in favor of the emergence of terbium fluorescence, and this inversion of fluorescence wavelengths practically is complete at 77° K.

In the present state of his research, the applicant therefore believes having implemented in rare-earth chelates a thermally assisted energy-transfer effect that hitherto was unknown in these chelates.

To achieve this effect, the following rules must be observed:

- while not coinciding, the energy levels of the rare earth nevertheless must be fairly close to one another because the low temperatures would decrease the transfer gap between these levels by a widening phenomenon of the transfer level of each rare earth,
- the ligands used in the preparation of these chelates must absorb UV and effectively transmit this energy to the rare earths to trigger their fluorescence; in the cited Examples, the ligands used are beta-diketones and within the scope of this invention are a preferred class of ligands, however other ligands also are applicable without thereby transcending this invention,
- the respective proportions of the rare earths must be set in relation to the lowest applicable temperature, that is, if a chelate of Example 1 (Tb-Eu) were used, a chelate of 99% Tb and 1% Eu would be selected if the green Tb fluorescence is desired already at 0° C., whereas proportions of 50% Tb and 50% Eu would be selected for this green fluorescence to appear only at about 77° K.; as a general rule, the less Eu, the earlier the appearance of the Tb fluorescence as the temperature is being lowered; this rule applies not only to the cited Examples, but also to embodiments wherein the expert shall use other combinations of rare earths and other ligands.

One of the advantages of this invention over the prior art is that illustratively a highly satisfactory simultaneous chromotropic the thermotropic effect can be achieved in order to avoid imitation and counterfeiting. 1% by weight (relative to the weight of the fibers to be dyed) of polyamide dye can be added to the polyamide fiber dyeing bath of Example 2, for instance Telon Blue K GGL 200% made by Bayer, and in this manner security fibers can be prepared which offer very high security because being cumulative in their thermotropic and chromotropic effects. These security fibers may change color three times:

- a first time at ambient temperature from blue when under solar or artificial light to fluorescent red when under UV,
- a second time at 4° K. from blue when under solar or artificial light to fluorescent green when under UV,
- a third time at a temperature between the two cited above and selected in relation to the composition in rare-earth chelates from blue when under solar or artificial light to fluorescent orange when under UV, tending either toward the red or toward the green depending on the temperature selected for this authentication.

It is extremely difficult to imitate or counterfeit such a fiduciary document with this chromotropic and thermotropic effect, and the knowledge of such an effect shall come with difficulty to the forger who will not have the technical equipment to measure fluorescence at very low temperatures.

Moreover, in lieu of dyeing security fibers as is done in Example 2, one may also introduce an energy-transfer chelate into the continuously extruded filaments where this applies, and to cut ultimately these filaments into security fibers, or else to twist them into sewing yarn.

I claim:

1. A printing varnish comprising at least one marking product, the marking product comprising rare-earth chelates or substrates including rare-earth chelates, the rare-earth ion present in the chelates arising from at least two different rare-earths, an energy transfer taking place between the two rare-earths and causing a change in fluoroscence wavelength of the chelates when exposed to ultraviolet radiation as a function of the temperature of the chelate so made and/or of the substrate including the chelate,
   the varnish being colorless in solar or artificial light and changing in its fluorescence wavelength when under UV radiation as a function of temperature.

2. A printing varnish as recited in claim 1, wherein the chelates in their organic part consists of a beta-diketone and in their inorganic part of at least two distinct rare-earths selected from the group of lanthanides, yttrium and thorium.

3. A printing varnish as recited in claim 1, wherein a chelate is juxtaposed on a fiduciary document to another chelate comprising only rare-earth ions of a single rare-earth which is already present in the first chelate, and in that the comparison of the fluorescence wavelengths of these two chelates when carried out at ambient and at low temperatures and under UV radiation represents a means for identification.

4. Printing ink comprising at least one marking product, the marking product comprising rare-earth chelates or substrates including rare-earth chelates, the rare-earth ion present in the chelates arising from at least two different rare-earths, energy transfer taking place between the two rare-earths causing a change in fluoroscence wavelength of the chelates when exposed to ultraviolet radiation as a function of the temperature of the chelate so made and/or of the substrate including the chelate,
   the ink changing its fluorescence wavelength as a function of temperature when under UV radiation.

5. A printing ink as recited in claim 4, wherein the chelates in their organic part consists of a beta-diketone and in their inorganic part of at least two distinct rare-earths selected from the group of lanthanides, yttrium and thorium.

6. A printing ink as recited in claim 4, wherein a chelate is juxtaposed on a fiduciary document to another chelate comprising only rare-earth ions of a single rare-earth which is already present in the first chelate, and in that the comparison of the fluorescence wavelengths of these two chelates when carried out at ambient and at low temperatures and under UV radiation represents a means for identification.

* * * * *